United States Patent [19]

von Gutfeld

[11] 3,778,785

[45] Dec. 11, 1973

[54] METHOD FOR WRITING INFORMATION AT NANOSECOND SPEEDS AND A MEMORY SYSTEM THEREFOR

[75] Inventor: Robert Jacob von Gutfeld, New York, N.Y.

[73] Assignee: International Business Machines Corporation, Armonk, N.Y.

[22] Filed: Apr. 20, 1972

[21] Appl. No.: 246,027

[52] U.S. Cl. .................... 340/173 LS, 340/173 LM

[51] Int. Cl. .......................................... G11c 13/00

[58] Field of Search ............... 340/173 LS, 173 LM; 346/74 R, 76

[56] References Cited

UNITED STATES PATENTS

| | | | |
|---|---|---|---|
| 3,636,526 | 1/1972 | Feinleib | 340/173 LS |
| 3,678,852 | 7/1972 | Feinleib et al. | 340/173 LS |

OTHER PUBLICATIONS

IBM Tech. Dis. Bul. Vol. 13 No. 1, June 1970, "Optical Memory, Display & Processor Using Amorphous Semiconductors" pp. 96–98, M. Dakss & U. Sadagopan

*Primary Examiner*—Terrell W. Fears
*Attorney*—J. Jancin, Jr. et al.

[57] ABSTRACT

A method is provided in which information may be written at ultrahigh speed onto a memory material, limited only by the pulse time of a laser beam employed. A semiconductor memory material capable of changing from the crystalline to the amorphous state, each state being stable at ambient conditions, is utilized. Information may be written and stored by exposing discrete portions of the semiconductor material to a high speed pulsed laser wherein said exposed portions are converted from the crystalline to the amorphous state.

8 Claims, 9 Drawing Figures

METHOD FOR WRITING INFORMATION AT NANOSECOND SPEEDS AND A MEMORY SYSTEM THEREFOR

BACKGROUND OF THE INVENTION

1. Field of the Invention

This invention generally relates to a method of writing, reading and erasing information and a memory system therefor, and, more particularly, to a system which is especially adapted for use in high speed writing.

2. Prior Art

It is known that certain semiconductor materials may exist in a stable condition at room temperature in either a substantially amorphous or substantially crystalline state. It has also been found that such material can be converted from one state to the other by supplying sufficient energy to heat the material to its melt temperature and then allowing it to cool under controlled conditions so that recyrstallization will or will not occur depending upon the conditions used. Such materials have been proposed for storing and retrieving information, since discrete areas may be written upon by selectively changing those areas from one state to the other.

It is recognized that the speed at which the material may be converted from the amorphous to the crystalline state is limited by the time that must be allowed for crystallization to take place. Such a change may be accomplished by providing a low amplitude energy pulse for sufficient duration, generally greater than one millisecond, to slowly heat the material to just below its melt temperature, after which, the material slowly cools in the crystalline state. On the other hand, to convert the material from a crystalline to an amorphous state, rapid cooling is essential. This change, may be accomplished by pulsing the material with a high energy pulse so as to raise the material to the melt temperature after which, there must be a rapid drop in temperature, freezing the material in the amorphous state before crystallization can occur.

The prior art generally contemplates the use of crystallization of discrete portions of an amorphous material to write, since the material, as deposited, is already in substantially the amorphous state. Subsequent reconversion of the crystalline areas to the amorphous state is employed to erase. In such a mode of operation, the speed at which writing is accomplished is limited, since the heating and cooling of the material must be done at a sufficiently slow rate to allow for crystallization. Prior art disclosures have generally not considered a reverse mode of writing, i.e., the changing of discrete portions from a crystalline to an amorphous state, and where it has been suggested, times in order of microseconds have been specified as in U.S. Pat. No. 3,530,441 to S. R. Ovshinsky, filed Jan. 15, 1969. Although it has been recognized that conversion from the crystalline to the amorphous state is somewhat quicker than conversion from the amorphous to the crystalline state, since time for recrystallization is not required, speed several orders of magnitude slower than nanosecond times was necessary to allow sufficient energy to be fed into the material to heat it to its melting temperature, melt it and allow it to cool. Speeding up the melting process by increasing the energy fed into the system was impractical since such high energy required large powerful lasers which were impractical for use in a memory system. Furthermore, with the increase in energy, the area surrounding the exposed regions was heated substantially to its melt temperatures causing large spot sizes with poor definition against the crystalline background.

Another problem results from the energy dissipated in the form of heat causing an overall rise in temperature of the surrounding semiconductor material as well as an increase of temperature of the supporting substrate in the area of the region exposed. Since rapid cooling is essential to freeze the exposed regions in the amorphous state, such cooling becomes impossible where there is a substantial rise in temperature approaching the melting point in the surrounding area.

It is therefore an object of this invention to rapidly heat a semiconductor material to its melt temperature without significant thermal diffusion of the heat into the surrounding semiconductor material or in a localized area of the substrate.

It is a further object of this invention to form extremely small discrete amorphous regions with good definition against a crystalline background whereby bit densities are greater than was heretofore contemplated for such memory materials.

It is yet another object of this invention to write at speeds not heretofore contemplated for such materials, utilizing inexpensive low-powered lasers.

SUMMARY OF THE INVENTION

The above objects are accomplished by utilizing a semiconductor material which may be converted from a crystalline to an amorphous state in extremely small discrete areas for the writing and storing of information and which may be reconverted from the amorphous to the crystalline state for the erasing of such information. The writing is accomplished at ultra high speeds by providing a high speed pulsed laser focused on an extremely small area with sufficient energy density to melt the crystallized material at the center of the area exposed. I have discovered that by the use of a thermally conductive substrate, extremely short laser pulses focused on extremely small areas results in dissipation of excess heat thereby effectively eliminating heat diffusion into unexposed regions of the material or localized heating of the substrate. Due to this local heating phenomena, rapid cooling rates necessary to freeze the exposed regions into the amorphous state are obtained. Additionally, due to the rapid cooling rates obtainable at these pulse times, the material may be preheated prior to laser exposure to approximately its glass transition temperature in order to further reduce the amount of energy required to cause melting, thus enabling the use of small inexpensive, low-powered lasers.

The foregoing and other objects, features and advantages of the invention will be apparent from the following more particular description of the preferred embodiment of the invention as illustrated in the accompanying drawings.

BRIEF DESCRIPTION OF THE DRAWINGS

FIG. 2*a* illustrates the conversion of a material from the amorphous to the crystalline state and from the crystalline to the amorphous state using a relatively low energy density as contemplated by the prior art.

FIG. 2*b* demonstrates the conversion of the material from the crystalline to the amorphous state using a fast pulsed laser focused to give a high energy density.

FIG. 2*c* shows the time required to convert a material from the crystalline to amorphous state wherein the material is preheated to approximately its Tg temperature.

FIG. 2*d* illustrates a problem which occurs if the material is preheated to approximately its melting temperature.

DETAILED DESCRIPTION OF THE PREFERRED EMBODIMENT

Figure 1:
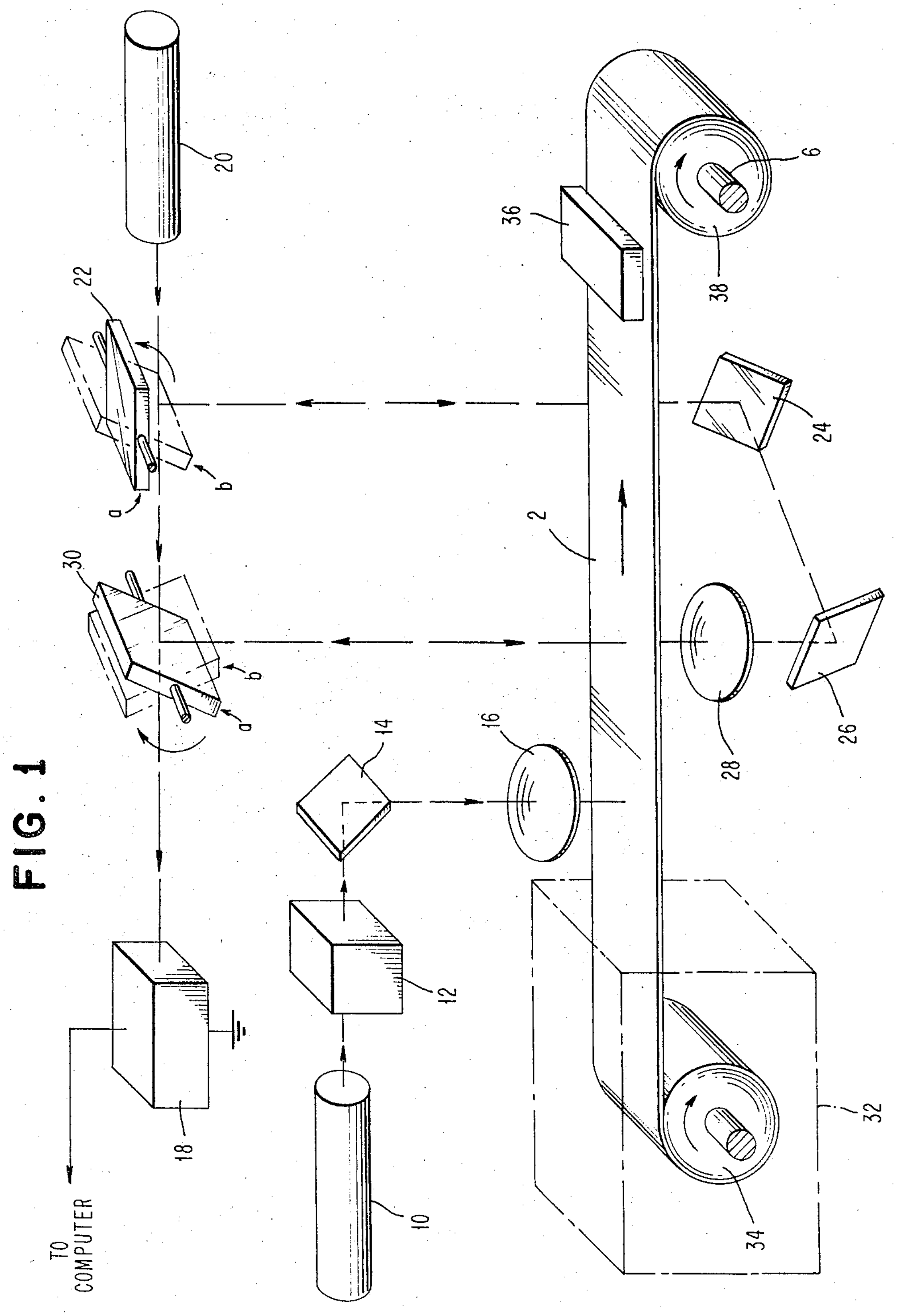
FIG. 1 is a diagrammatical illustration of the memory system with high speed write capabilities, including preheating, reading, and both bulk and selective erasing.

Referring to FIG. 1, a memory material consisting of a thin film of chalcogenide semiconductors 2, deposited onto a thin conductive substrate material 4, preferably transparent to enable reading through the substrate, is moved by drive means 6. The semiconductor material composition may vary widely, but generally contains Group VI and/or IV semiconductor materials forming chalcogenide alloys (oxygen, sulfur, selenium, tellurium, silicon, germanium, tin). Group V elements may also make up a portion of the alloy and two, three or even more elements may form the alloy mixture. A suitable material which is relatively stable in both the amorphous and crystalline states at ambient conditions is TeGeAs. The substrate, 4, upon which the semiconductor material is deposited may be a tape, disc, drum or other structure suitable for driving at high speeds. For disc or drum applications a clear quartz substrate is suitable while for tape applications, quartz or an extremely thin layer of metal deposited on a clear, flexible film may be employed. In most instances, sufficient transparency will exist to allow light to pass through the substrate for reading and erasing but if a transparent substrate is not used, reading may be accomplished by reflecting a beam off the semiconductor material. The semiconductor material is deposited on the substrate by evaporation or sputtering techniques, after which the material is slowly heated to above the glass transition temperature and allowed to slowly cool so that substantial crystallization takes place.

Figure 4:
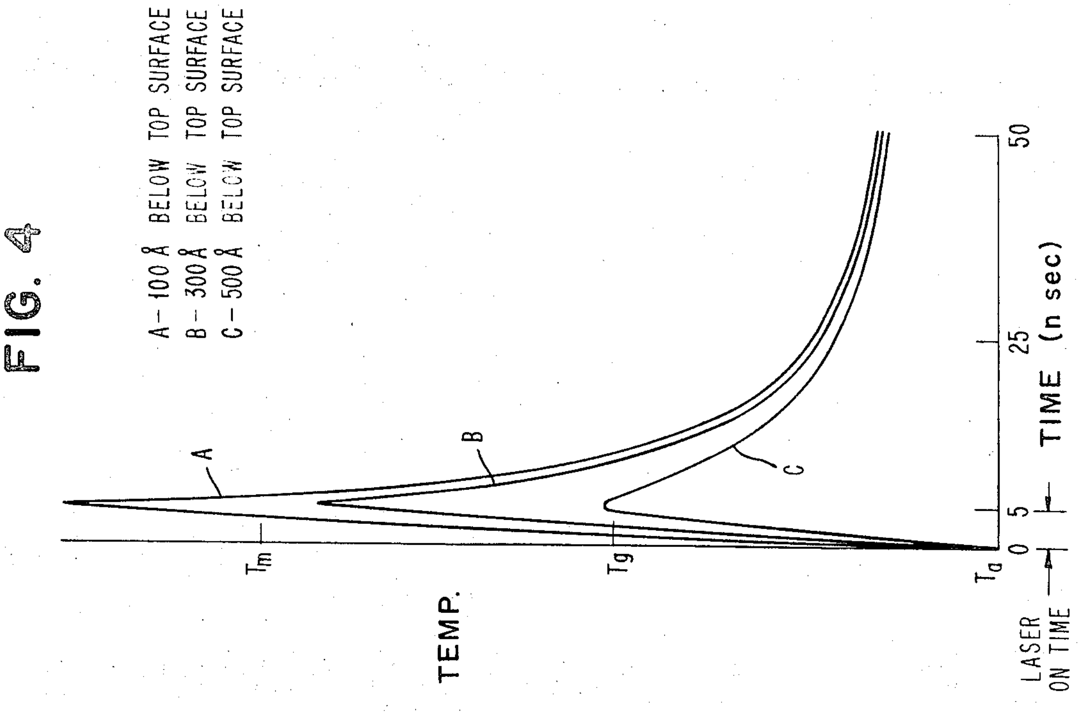
FIG. 4 illustrates the temperature obtained at various depths from the exposed surface as a function of time.

This memory material is driven past a laser beam 8 produced by laser 10 having extremely short pulses in the range of less than 10 nanoseconds. The laser system may be a Nd-YAG, argon, or GaAs lasers operating in a continuous wave, mode-locked manner and selectively pulsed by a fast Pockel cell 12 or optical modulator external to the laser cavity. Typical of such a system is the GaAs laser with a Gunn Effect optical modulator described in IBM Technical Disclosure Bulletin, Vol. 9, No. 8, Jan. 1967, page 1,006. Total reflecting mirror 14 then transmits the patterned pulses which are focused by lens 16 onto the memory material in a spot less than 3 microns in diameter. Lens 16 must be a high quality lens to focus the laser energy in a small area thereby obtaining the high energy density required to heat the material to its melt temperature at nanosecond speeds. Also, fine focusing is required to ensure the formation of discrete spots as the material moves pass the beam. FIG. 4 illustrates the temperature profile obtained with a finely focused beam and a heat dissipating substrate from the center of the spot outward in accordance with this invention. The now written-on material is immediately read for error detection or for use in the computer by means of an optical pulse detector 18. Light may be transmitted to pulse detector 18 by means of a second laser 20 in which rotating mirrors 22 and 30 are turned to the (b) positions. The laser beam is thus reflected from mirror 22 to mirror 24 and 26 and focused onto the written film through lens 28. Since the optical reflection and absorption characteristics of the crystalline versus the amorphous material varies greatly, the light absorbed through the film will differ in the crystalline and the amorphous regions. This light is then reflected off mirror 30 which is in the (b) position to the optical pulse detector 18. An optical detector suitable for reading and printing the stored information is described in U.S. Pat. No. 3,430,212 and assigned to the same assignee as the present invention. Since other physical properties between the crystalline and amorphous state of the written on material also differ, alternate devices which detect these differences in properties may be used in place of the optical pulse detector 18.

Laser 20 may also be used to erase selected portions of the recording medium by rotating mirrors 22 and 30 into the (a) position as shown in FIG. 1 and more fully described in the state of the operation.

Heating region 32 is used to preheat the rolled material 34 to approximately its glass transition temperature in order to minimize the energy output required by laser 10. Heater 36 may or may not be used to bulk erase the material by converting the amorphous spots back to their crystalline state. The material may then be rolled, 38, for re-use or if not completely erased, for archival storage.

STATEMENT OF THE OPERATION

A. The Write Cycle

Referring again to FIG. 1, memory material 2 previously described, may be first heated in heater 32 to approximately its glass transition temperature. Since the material is initially in substantially a crystalline state, which is the more ordered and stable state, as long as the melt temperature is not reached, the material will remain substantially crystalline. It should be noted that such a preheating step would not be possible if the material was initially in the amorphous state, since as the material is heated to its glass transition temperature, crystallization begins to occur, making the material unsuitable for forming discrete crystalline or amorphous regions.

Figure 2A:
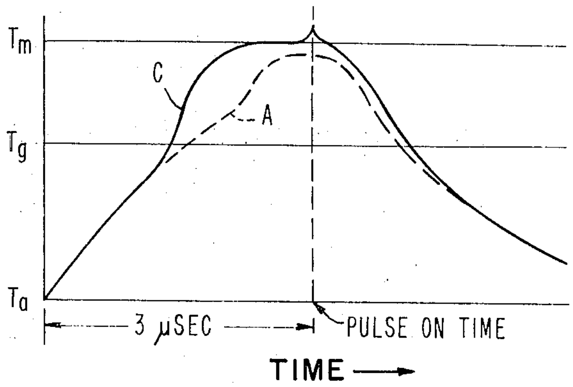
FIG. 2a PRIOR ART
FIGS. 2*a–d* illustrate the times required to go from the crystalline to the amorphous state and from the amorphous to crystalline state with various energy densities and pulse times.

Referring now to FIG. 2, FIG. 2a shows the required time contemplated by the prior art to go from the amorphous to the crystalline state and from the crystalline to the amorphous state. Curve A shows the minimum time above the glass transition temperature required for crystallization of a material initially in the amorphous state. A relatively long pulse time in the order of microseconds coupled with a relatively low energy density is required to obtain curve A. Shortening the pulse time is not possible since a minimum time above the glass transition temperature is required to cause crystallization. Curve C shows the time required to go from the crystalline to the amorphous state. It is recognized that the most important portion of the curve is the cooling time after the material is heated to above the melt temperature. However, in order to obtain sufficiently rapid cooling to freeze the melted material in the amorphous state, the energy which can be fed into the material as a function of time is limited and requires great control so as to prevent excessive heating of the surrounding material and the substrate thereby causing insufficient cooling rates.

I have discovered that I can decrease the laser pulse time into the nonosecond range using inexpensive, low powered lasers. This is accomplished by converting extremely small areas from the crystalline to the amorphous state whereby a sufficient energy density to melt the exposed material is obtained using a low total energy output laser. Additionally, due to the small areas exposed, extremely large bit densities are possible. Rapid cooling is accomplished by adjusting the conductivity of the substrate with the optical absorption characteristics of the semiconductor material. In this manner, diffusion of heat to the surrounding unexposed semiconductor material as well as localized heating of the substrate is eliminated, enabling sufficiently rapid cooling rates to freeze the melted material in the amorphous state.

Incident laser light decays exponentially with distance, $z$, into the film and substrate so that $$I = I_0 \exp [(- r^2/(2r_0^2) - \Delta z]$$

where $I_0$ is the maximum light intensity per unit area, $r$ is the distance from the beam's center to any point on the surface, $r_0$ is the variance of the gaussian and $\alpha$ is the optical absorption constant of the semiconductor material.

Figure 2B:
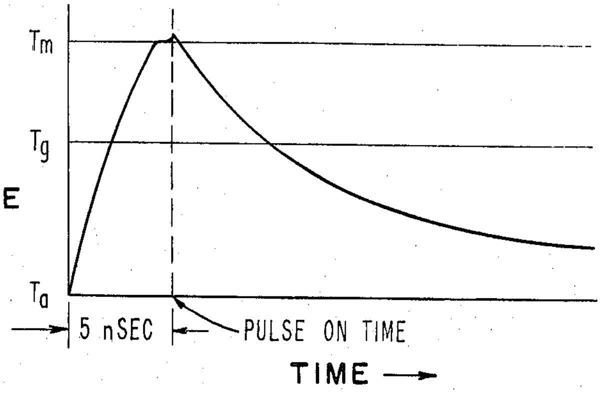

By adjusting the film thickness ($z$) of the semiconductor material so that $\alpha z$ is greater than 1, only the exposed region of the semiconductor material will be converted from the crystalline to the amorphous state since the excess heat energy will be quickly dissipated by the conductive substrate. This unusually rapid cooling rate, as shown in FIG. 2*b*, has been found to exist only for pulse widths of 100 nanoseconds or less. Exposure of the material for longer time periods, notwithstanding the dissipation of some of the heat by the conductive substrate, results in a relatively large radial diffusion of heat into the unexposed regions of the semiconductor material, preventing rapid cooling and fine discrete spots.

Figure 2C:
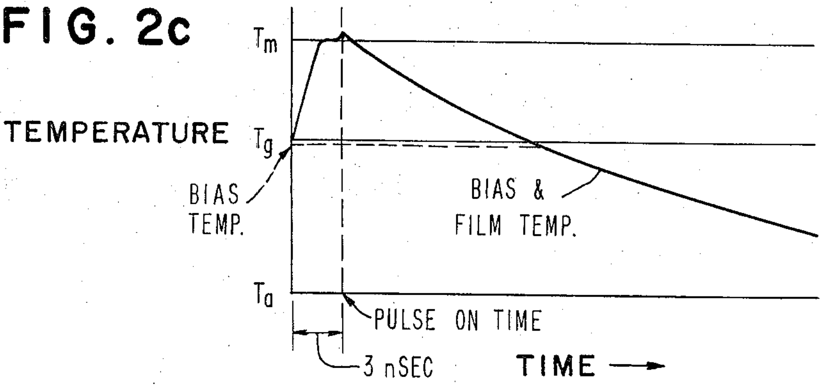
Figure 2D:
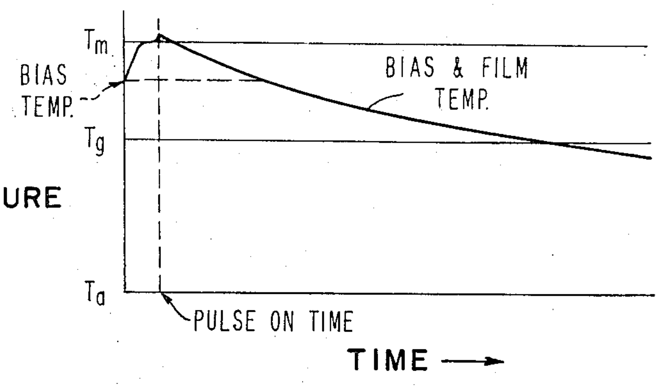

It can be seen from FIG. 2*b*, that by focusing the beam on a small area, a sufficient energy density is obtained to raise the material to its melt temperature in a short pulse time, after which the material rapidly cools due to the rapid heat dissipation, freezing it in an amorphous state. The pulse time required is only limited by the energy required to raise the material to its melt temperature and melt it. This energy requirement can be further reduced by focusing the beam onto a material which has been preheated to approximately its glass transition temperature as shown in FIG. 2*c*. By preheating, the pulse time required to heat the material from its ambient temperature to its glass transition temperature is eliminated. This is possible because of the unusually rapid cooling rates obtainable with this system which I have estimated to average up to $10^{10}$°C/sec. However, as shown in FIG. 2*d*, care must be taken not to excessively preheat the bulk material since the rapid quench time required to freeze the material in the amorphous state is then lost, resulting in recrystallization of the melted material. Suitable high temperature materials such as quartz, exhibit sufficient heat dissipation characteristics to be used in this system. Metallized plastic films whose physical properties will not be affected by the preheat step may also be employed to form a flexible substrate as shown in FIG. 1.

It should be noted that the minimum energy required is that which will convert a sufficient density from the crystalline to the amorphous state so it can be read by optical detector 18. I have discovered that energy sufficient to convert a one micron wide spot to a depth of approximately 100A may be detected by the optical detector of the system shown in FIG. 1. Incident energy densities, in the order of ½ nj/$\mu^2$ are sufficient for an $r_0$ equal to 2½ microns.

Figure 3:
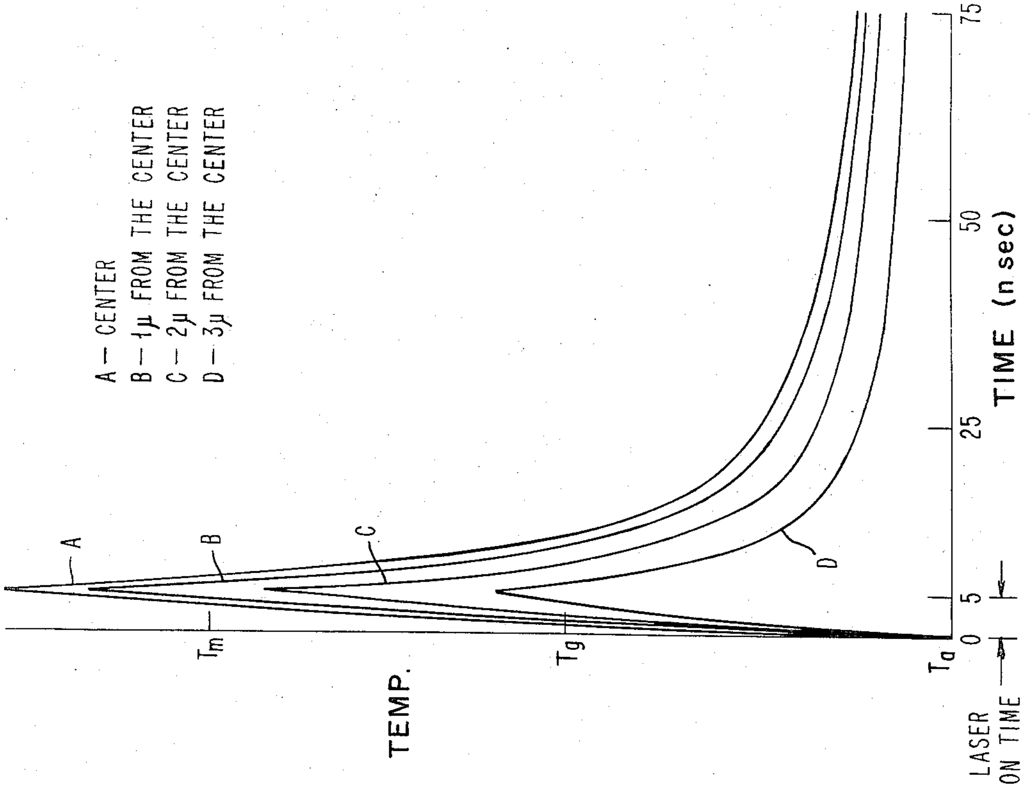
FIG. 3 shows the temperature attained at various distances away from the focused laser beam as a function of time using a heat dissipating substrate.

FIG. 3 shows the temperature profile of the area of the material exposed to a finely focused laser beam pulsed for approximately 5 nanoseconds in which a one micron spot is raised above the melt temperature and changed to substantially the amorphous state in accordance with this invention. FIG. 4 shows a temperature profile of the thickness of the exposed film in which approximately 100A from the surface has been melted and substantially converted to the amorphous state, in accordance with this invention. With the decrease in total energy required to now melt the material, due to the small densities melted as well as the preheat step, extremely short pulses caused by cell 12 may be used in conjunction with a relatively low-powered laser 10 (See FIG. 1). Discrete bits of information are obtained by driving memory material 2 by means of driver 6 up to a rate of $10^5$ cm per second with lens 22 focusing the beam in one to two micron spots. By pulsing the beam every 5 nanoseconds, two micron diameter spots on 5 micron centers are obtained. The entire width of the memory material may be written upon by switching direction of the laser beam as generally described in U. S. Pat. No. 3,432,767, assigned to the same assignee as the present invention.

B. The Read Cycle

The information may be read for error detection or for use in the computer by detecting the difference between the amorphous spots and the crystalline background. As previously discussed, 2 micron diameter spots, 100A deep on 5 micron centers may be readily detected. Since there is a large change in the reflectivity and absorption of the crystalline versus the amorphous film, the pattern is read by an optical detector which conveys a signal to a computer print out or display device. Laser 20 emits a beam which is reflected off mirrors 22, 24 and 26, focused by lens 28 through the transparent substrate and the memory material, and fed into the optical pulse detector 4 by mirror 30. Mirrors 22 and 30 are rotated to the (b) position. The signal from the optical detector 18 may be designed to give a pulse whenever there is an increase in light due to the decreased absorption in the amorphous region. An alternate method may also be used in which a light beam is reflected off the memory material and decreased energy in the spot region initiates a signal pulse from the optical detector. This method is particularly applicable where opaque substrates are employed.

C. The Erase Cycle

Various means for erasing the recorded information may be used. The erasing is accomplished by reconverting the amorphous spots back to their crystalline condition by supplying energy which will bring the material to approximately its melt temperature in a sufficient time to cause recrystallization as generally shown in FIG. 2*a*. By the use of a second laser with sufficient energy to cause recrystallization, erasing may be accomplished. By positioning mirrors 22 and 30 in the (a) position, adjusting the power output of laser 20 so as to give the profile of FIG. 2*a* while operating it in a continuous wave mode, an entire track of the material may be erased. By selectively pulsing the laser in a similar manner used in writing, the material may be selectively erased. It should be noted, however, that since erasing is accomplished by changing the amorphous regions back to the crystalline state, longer pulses than that used in writing are required. Thus, to selectively erase, the speed at which the material is driven by drive means 6 must be substantially reduced. Since this memory system is contemplated for use in archival storage, the slow speed erasing is not a significant shortcoming. To bulk erase an entire medium or large portions thereof, heater 36 may be activated to a sufficient temperature to convert the amorphous regions back to their crystalline state.

SPECIFIC EXAMPLES

Sample memory materials were prepared by both sputtering and evaporation techniques with substrates either at room or liquid nitrogen temperatures. In the case of sputtering, the starting material consisted of a powder containing the three elements, Te, Ge and As in proper proportions to produce films of composition $Te_{80}Ge_{15}As_5$. The film composition was ascertained after deposition by means of an electron beam microprobe. The evaporated samples were prepared from boules of bulk material of the appropriate composition. Film thicknesses were nominally 600A with an over-all smooth appearance when viewed in white light both in reflection and transmission at magnifications up to 1,000 times. The substrates were several mil thick pieces of vitreous quartz and single crystal sapphire. However, if the memory is to be in the form of a tape, suitable flexible substrates such as thin layers of quartz or aluminum on mylar, should be used. Some NaCl substrates were also used so that deposited films could be floated off for study by transmission electron microscopy. To prepare the as-deposited amorphous films for writing, small pieces of the original sample were sectioned off and mounted on a transparent heating stage. By bringing the samples to temperatures in the range 75–90°C in air, considerable crystallization was obtained which was subsequently verified by electron microscopy. The phase change could be monitored in situ by observing the change in optical reflection and/or transmission.

For writing in the nanosecond range, the output of a dye laser optically pumped by a pulsed nitrogen laser was employed since the optical characteristics of such dye lasers can be varied, permitting the evaluation of a broad range of optical characteristics. However, inexpensive lasers with fixed optical characteristics such as GaAs lasers are equally effective. Pulse widths of 2–5 nsec, centered near 5,800A, capable of several kilowatts of optical power were employed. The output of the dye laser was attenuated and focused into a Leitz microscope to permit the viewing of the sample in both reflection and transmission.

Changes in reflectivity between the written and unwritten spots of the material were measured by writing large spots (12 micron diameter) with the dye laser (using a 20X microscope objective), then probing these spots with small spots of low intensity pulses of 6,471A (kyrpton light using the Pockel cell and a 45X microscope objective). For an absolute value of the reflectivity these amplitudes were compared to those obtained from a front surface aluminum mirror (reflectivity ≈ 90% at 6,500A).

Measurements were made on these samples after two weeks and eight weeks to study the extent of fading, the results of which are summarized in Table I. Sample A was maintained in complete darkness for the two weeks time, B in room light (in the laboratory with overhead lights on approximately 50% of the time), and C mounted so as to be in direct sunlight causing also some unknown rise in temperature.

TABLE I

| | Sample | Written Spot (% Reflected) | Unwritten Background (% Reflected) |
|---|---|---|---|
| *a* | A | 36 | 59 |
| | B | 40 | 63 |
| | C | 36 | 60.5 |
| *b* | A | 43 | 61.5 |
| | B | 43 | 61.5 |
| | C | 44 | 61.5 |
| *c* | A | 41 | 58 |
| | B | 41 | 58 |
| | C | 41 | 58 |

*a* = initial reading; *b* = after 2 weeks; *c* = after 8 weeks

From Table I it is evident that little fading occurred, showing the material's suitability as a permanent storage medium.

The structural state of the material was investigated by transmission electron microscopy and electron diffraction. Chalcogenide specimens suitable for electron microscopy were evaporated onto NaCl substrate. The samples were subsequently subjected to laser writing and erasure after thermal crystallization.

The group of specimens examined consisted of written and both thermally and optically (laser beam) erased and rewritten samples. After the writing and erasing steps the specimens were separated from the NaCl substrate by dissolving the latter in water. The chalcogenide specimens were collected on electron microscope grids and examined in an electron microscope.

The unwritten background material (after thermal cycling) was found to be a two phase system consisting of almost pure tellurium crystals of the order of 250–500A in size and an amorphous germanium-tellurium phase. After nanosecond pulse writing with the dye laser most of the crystallites were found to disappear and the material has a diffraction pattern characteristic of an amorphous material. Thermal erasing produced crystallization of the tellurium, the morphology of which was similar to the initial starting material. An equivalent structure was obtained on optical erasing. The laser requirements to produce micron sized melted regions were obtained by solving the inhomogeneous thermal diffusion equation, $$\rho c\ \delta T/\delta t = K \nabla^2 T + A(x,y,z,t)$$

where K, $\rho$ and $c$ are the thermal conductivity, mass density and heat capacity, all taken as temperature independent for computer calculations. $A(x,y,z,t)$ is the heat source term (corresponding to the laser pulse) in units of power/volume as a function of position and time, with T and t the temperature and time, respectively. The incident laser light decays exponentially with distance, $z$, into the film and substrate so that $$I = I_0 \exp\left[\left(-r^2/2r_0^2\right) - \alpha z\right]$$

where $I_0$ is the maximum light intensity per unit area, $r$ is the distance from the beam's center to any point on the surface, and $r_0$ is the variance of the gaussian. I assumed a reflection coefficient of 0.65 at the air-chalcogenide interface and an optical absorption constant, $\alpha = 5.0 \times 10^5$ cm$^{-1}$. The reflection coefficient is consistent with the values of Table I for 6,471A, while the absorption coefficient is an approximate average of the coefficient for pure Te in the amorphous and crystalline state. The computer solutions obtained were for 600A thick films on vitreous quartz substrates, all initially at room temperature. The input pulse is 1 watt, the duration 5 nsec. Values of additional parameters used are given in Table II.

TABLE II

| | K (w/cm-°K) | c (joules/gm-°K) | $\rho$ (gm/cm$^3$) |
|---|---|---|---|
| $Te_{80}Ge_{15}As_5$ film | $6.15\times10^{-3}$ | $2.9\times10^{-1}$ | 5.7 |
| Vitreous quartz substrate | $1.02\times10^{-2}$ | 1.35 | 3.0 |

It is important that the thermal conductivity and heat capacity of the substrate be adequate to dissipate the excess heat and eliminate diffusion of heat in the semiconductor material. Thus, whether a substrate material is suitable is dependent upon the physical properties of the semiconductor material which determines temperature diffusion.

Figure 6:
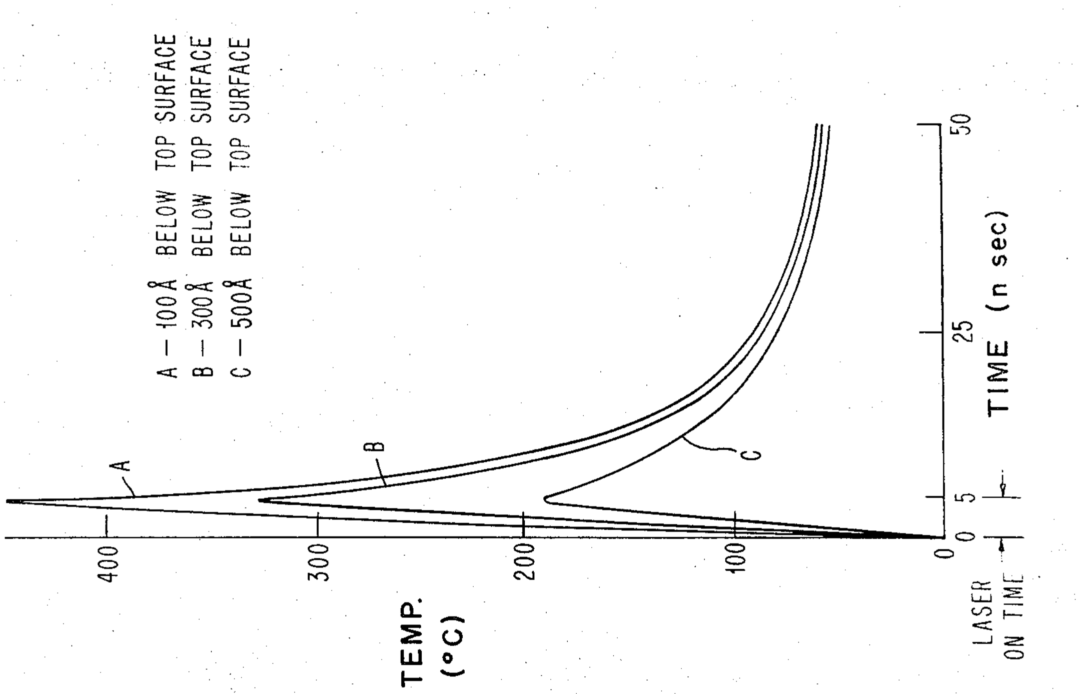
FIG. 6 is the time-temperature curve for various distances away from the exposed surface of a $Te_{10}Ge_{15}As_5$ material.
Figure 5:
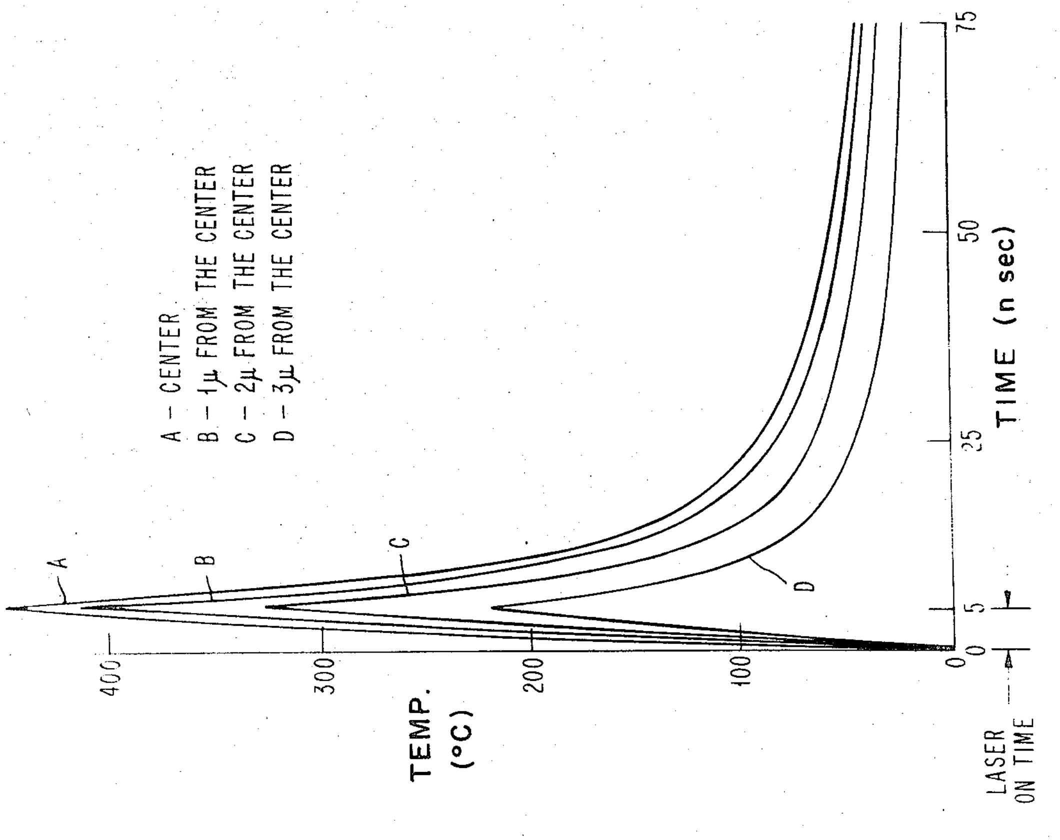
FIG. 5 is the time-temperature curve for areas away from the center of a laser beam of width about 7 microns (i.e., $I=I_0e^{-1}$) for an incident power input of one watt on a $Te_{80}Ge_{15}As_5$ material and a quartz substrate.

All solutions scale linearly with power since the thermal and optical parameters are assumed independent of temperature. Shown in FIG. 5 is the temperature rise and decay of the film 100A below the surface (referred to as the surface temperature) with the distance from the center, $r$, as a parameter and subjected to a 1 watt input power. The peak temperature at the center is somewhat above $T_m$, the melting temperature being approximately 375°C. The curves indicate that 0.8 watt power input or an energy density of ½$nj/\mu^2$ sufficient to reach $T_m$, thus allowing for lower powered lasers. The heat of fusion was not included in the calculations and therefore an allowance must be taken in using these solutions. Since the heat of fusion per unit volume for Te is approximately twice the heat necessary to raise the temperature of Te per unit volume from room temperature to $T_m$, cooling rates for melted regions are 3 times longer than those of unmelted regions at $T_m$. Also from these curves it can be seen that the heating portion is nearly adiabatic with negligible radial diffusion (the diffusion length in 5 nsec is ~ 400A) and little heat loss to the substrate. Additionally, the region only 1$\mu$ from the center reaches nearly the same temperature as the center ($r = 0$) while 3$\mu$ from the center the temperature rise is only one half that of the center after 5 nsec. Finally, it is apparent from the curves that rapid cooling follows the termination of the light pulse with the surface temperature falling to approximately one half the maximum temperature rise in 5 nsec for an average quench rate of up to $5 \times 10^{10}$°C/sec. A comparison of the temperatures as a function of depth into the film is shown in FIG. 6 at a position r = 0. Here the effects of the finite optical absorption constant are evident with the film at a depth equal to 500A rising to a temperature about one half that of the 100A depth. The film reaches a uniform temperature with depth after 25 nsec.

While the invention has been shown and described with references to preferred embodiments thereof, it will be appreciated by those of skill in the art that variations in form may be made therein without departing from the spirit and scope of the invention.

What is claimed is:

1. A method for writing information at high speeds comprising the steps of:

providing a layer of memory semiconductor material having a given thickness and thermal conductivity, which material is substantially ordered and generally crystalline but capable of changing to a generally disordered and amorphous stable state on a substrate of greater thermal conductivity than said layer, capable of rapidly dissipating heat;

pulsing a laser at time intervale of less than 100 nanoseconds with each pulse supplying sufficient energy to melt discrete portions of less than 5 microns in diameter of the crystalline material;

said diameter being at least 10 times the thickness of said layer;

cooling said small discrete portions so they are frozen in a generally disordered amorphous stable state whereby a pattern of easily detectable, generally amorphous, discrete small portions on a substantially crystalline background is obtained.

2. The method of claim 1 wherein the substrate includes a quartz material in contact with the semiconductor layer.

3. The method of claim 1 wherein the substrate includes a metal material in contact with the semiconductor laser.

4. A method of writing information at high speeds comprising the steps of:

providing a layer of memory semiconductor material having a given thickness and thermal conductivity, which material is substantially ordered and generally crystalline but capable of changing to a generally disordered and amorphous stable state on a substrate of greater thermal conductivity than said layer, capable of rapidly dissipating heat;

heating said material to approximately its glass transition temperature;

pulsing a laser at time intervale of less than 100 nanoseconds with each pulse supplying sufficient energy to melt discrete portions of less than 5 microns in diameter of the crystalline material;

said diameter being at least 10 times greater than the thickness of said layer;

cooling said small discrete portions so they are frozen in a generally disordered amorphous stable state whereby a pattern of easily detectable, generally amorphous, discrete small portions on a substantially crystalline background is obtained.

5. A method of writing information at high speeds, reading and selectively erasing, comprising the steps of:

providing a layer of memory semiconductor material having a given thickness and thermal conductivity, which material is substantially ordered and generally crystalline but capable of changing to a generally disordered and amorphous stable state on a substrate of greater thermal conductivity than said layer, capable of rapidly dissipating heat;

heating said material to approximately its glass transition temperature;

writing information by pulsing a laser at time intervals of less than 100 nanoseconds with each pulse supplying sufficient energy to melt discrete portion of less than 5 microns in diameter of the crystalline material and colling said small discrete portions to that they are frozen in a generally disordered amorphous stable state;

said diameter being at least 10 times greater than the thickness of said layer;

reading the information by detecting the difference in properties between the amorphous and crystalline regions;

selectively erasing the information by selectively pulsing a laser to expose amorphous discrete portions for a sufficient time to raise the temperature to just less than their melt temperature so that recrystallization occurs upon cooling.

6. A method of writing information at high speeds and bulk erasing comprising the steps of:

providing a laser of memory semiconductor material having a given thickness and thermal conductivity, which material is substantially ordered and generally crystalline but capable of changing to a generally disordered and amorphous stable state on a substrate capable of greater thermal conductivity than said layer, capable of rapidly dissipating heat;

heating said material to approximately its glass transition temperature;

writing information by pulsing a laser at time intervals with each pulse supply sufficient energy to raise the temperature and melt discrete portions of less than 5 microns in diameter of the crystalline material and cooling said discrete portions so they are frozen in a generally disordered amorphous stable state;

said diameter being at least 10 times greater than the thickness of said layer;

reading the information by detecting the differenct in physical properties between the amorphous and crystalline regions;

bulk erasing the discrete portions by heating the material to just less than its melt temperature so that crystallization occurs.

7. A high speed memory system the combination including:

a storage medium comprising a layer of semiconductor material having a given thickness and thermal conductivity, which material is capable of changing from a substantially crystalline state to a substantially amorphous state, both states being stable at ambient conditions and a substrate material of greater thermal conductivity than said layer, capable of rapidly dissipating heat;

a signal controlled pulsed layer pulsing at times of less than 100 nanoseconds with a focused beam of less than 5 microns with a predetermined energy density per pulse which changes that portion of the storage medium exposed from the substantially crystalline state to the substantially amorphous state;

said exposed portion of said semiconductor layer having a diameter at least 10 times greater than the thickness of said layer;

a drive means for transporting said storage medium past said pulsed laser with a predetermined speed which causes the formation of discrete amorphous regions at each pulse;

a temperature control means to maintain said semiconductor material at a temperature of approximately the glass transition temperature prior to laser exposure;

a read means for detecting the amorphous from the crystalline regions; and an erase means for converting the amorphous regions back to their crystalline state.

8. The memory system of claim 7 wherein the incident energy density is less than one half a nanojoule per square micron and the speed at which the storage medium is moved is approximately $10^5$ cm per second.

* * * * *